(12) United States Patent
Ackelid et al.

(10) Patent No.: US 8,308,466 B2
(45) Date of Patent: Nov. 13, 2012

(54) APPARATUS FOR PRODUCING A THREE-DIMENSIONAL OBJECT

(75) Inventors: Ulf Ackelid, Göteborg (SE); Göran Wallgren, Onsala (SE)

(73) Assignee: Arcam AB, Molndal (SE)

( * ) Notice: Subject to any disclaimer, the term of this patent is extended or adjusted under 35 U.S.C. 154(b) by 0 days.

(21) Appl. No.: 13/144,451

(22) PCT Filed: Feb. 18, 2009

(86) PCT No.: PCT/SE2009/050179
§ 371 (c)(1),
(2), (4) Date: Jul. 13, 2011

(87) PCT Pub. No.: WO2010/095987
PCT Pub. Date: Aug. 26, 2010

(65) Prior Publication Data
US 2011/0293770 A1 Dec. 1, 2011

(51) Int. Cl.
*B28B 1/16* (2006.01)
*B29C 35/08* (2006.01)
(52) U.S. Cl. ............ 425/174.4; 425/375; 425/470
(58) Field of Classification Search ........ 425/174.4, 425/375, 470, 471; 264/442–444, 485, 494–497; 700/98, 119
See application file for complete search history.

(56) References Cited

U.S. PATENT DOCUMENTS
4,401,719 A   8/1983   Kobayashi et al.
4,818,562 A   4/1989   Arcella et al.
(Continued)

FOREIGN PATENT DOCUMENTS
EP   0 289 116   2/1988
(Continued)

OTHER PUBLICATIONS

United States Patent and Trademark Office, Final Office Action for U.S. Appl. No. 12/745,081, dated Jun. 21, 2012, 6 pages, USA.

(Continued)

*Primary Examiner* — Dimple Bodawala

(57) ABSTRACT

The invention concerns an apparatus (1) for producing a three-dimensional object layer by layer using a powdery material which can be solidified by irradiating it with an energy beam, such as electromagnetic radiation or an electron beam, said apparatus (1) comprising: a working area (3) onto which layers of powdery material are to be placed; a powder storage unit (11) comprising a base surface (13) for supporting a supply of powder (2); and a powder distribution member (6); wherein the base surface (13) extends along a side of the working area (3), wherein the distribution member (6) extends in a direction along the base surface (13) and said side of the working area (3) and is arranged to be moveable in a plane above, and substantially parallel to, the base surface (13) and the working area (3), and wherein the distribution member (6) is arranged to be moveable into a supply of powder (2) placed onto the base surface (13) such as to bring about a transfer of a portion of powder from a side of the distribution member (6) facing away from the working area (3) to an opposite side of the distribution member (6) facing the working area (3), said distribution member (6) further being arranged to be moveable towards and across the working area (3) so as to distribute the portion of powder onto the working area (3). The invention is characterized in that at least a part (15) of the base surface (13) is arranged to be resilient in a vertical direction.

9 Claims, 4 Drawing Sheets

U.S. PATENT DOCUMENTS

| | | | |
|---|---|---|---|
| 4,863,538 A | | 9/1989 | Deckard |
| 5,647,931 A | | 7/1997 | Retallick et al. |
| 5,753,274 A | * | 5/1998 | Wilkening et al. ......... 425/174.4 |
| 5,876,550 A | | 3/1999 | Feygin et al. |
| 6,419,203 B1 | * | 7/2002 | Dang ........................... 248/585 |
| 6,554,600 B1 | * | 4/2003 | Hofmann et al. .......... 425/174.4 |
| 6,764,636 B1 | * | 7/2004 | Allanic et al. ................. 264/401 |
| 6,824,714 B1 | * | 11/2004 | Turck et al. .................. 264/40.1 |
| 7,165,498 B2 | * | 1/2007 | Mackrill et al. ................. 108/20 |
| 7,204,684 B2 | * | 4/2007 | Ederer et al. .............. 425/174.4 |
| 7,540,738 B2 | | 6/2009 | Larsson et al. |
| 7,686,605 B2 | * | 3/2010 | Perret et al. .................... 425/375 |
| 7,799,253 B2 | * | 9/2010 | Hochsmann et al. .......... 264/113 |
| 7,871,551 B2 | * | 1/2011 | Wallgren et al. ............. 264/241 |
| 8,083,513 B2 | * | 12/2011 | Montero-Escuder et al. 425/375 |
| 2004/0104499 A1 | | 6/2004 | Keller |
| 2006/0157892 A1 | | 7/2006 | Larsson |
| 2007/0182289 A1 | | 8/2007 | Kigawa et al. |
| 2007/0298182 A1 | | 12/2007 | Perret et al. |
| 2011/0133367 A1 | * | 6/2011 | Weidinger et al. ............ 264/497 |
| 2011/0316178 A1 | * | 12/2011 | Uckelmann ..................... 264/16 |

FOREIGN PATENT DOCUMENTS

| | | |
|---|---|---|
| EP | 0289116 | 11/1988 |
| EP | 1 721 725 | 11/2006 |
| EP | 2011631 | 1/2009 |
| JP | 2003245981 | 9/2003 |
| SE | 524467 | 8/2004 |
| WO | WO 9308928 | 5/1993 |
| WO | WO 0185386 | 11/2001 |
| WO | WO 2004/054743 | 7/2004 |
| WO | WO 2004/056511 | 7/2004 |
| WO | WO 2006/121374 | 11/2006 |
| WO | WO 2007/112808 | 10/2007 |
| WO | WO 2008/057844 | 5/2008 |
| WO | WO 2008/125497 | 10/2008 |

OTHER PUBLICATIONS

Office Action dated Nov. 8, 2011, U.S. Appl. No. 12/745,081.
International Search Report dated Sep. 4, 2010 for Application No. PCT/SE2009/050901.
International Search Report dated Sep. 17, 2008 for Application No. PCT/SE2008/000007.
International Search Report dated Sep. 2, 2008 for Application No. PCT/SE2007/001084.
International Preliminary Report on Patentability dated Nov. 27, 2009 for Application PCT/SE2007/001084.
European Search Report dated Feb. 16, 2012 for corresponding Application No. EP07 852 089.7.
Office Action dated Feb. 14, 2012 for U.S. Application No. 12/745,081.

* cited by examiner

APPARATUS FOR PRODUCING A THREE-DIMENSIONAL OBJECT

CROSS REFERENCE TO RELATED APPLICATIONS

This application is a national stage application, filed under 35 U.S.C. §371, of International Application No. PCT/SE2009/050179, filed Feb. 18, 2009, which is hereby incorporated by reference in its entirety.

BACKGROUND OF THE INVENTION

1. Field of Invention

This invention relates to an apparatus for producing a three-dimensional object layer by layer using a powdery material which can be solidified by irradiating it with an energy beam. In particular, the invention relates to the layerwize application of powder.

2. Description of Related Art

Equipment for producing a three-dimensional object layer by layer using a powdery material which can be solidified by irradiating it with electromagnetic radiation or an electron beam are known from e.g. U.S. Pat. Nos. 4,863,538, 5,647,931 and SE524467. Such equipment include for instance a supply of powder, means for applying a layer of powder on a working area, and means for directing the beam over the working area. The powder sinters or melts and solidifies as the beam moves over the working area. For product quality reasons it is important that the powder is evenly distributed over the working area and that the layer thickness is well-defined and corresponds to a predetermined value. Further, it is advantageous that the layer is quickly applied in order to keep the production rate as high as possible.

Traditional powder application means generally includes a feeding member and a distribution member where the former transfers a certain quantity of powder from the supply of powder to the distribution member, which in turn distributes the powder over the working area.

The conditions under which the powder application means work are rough; the temperature is high, powder particles find their way into openings and slits, evaporated powder material condensate and form coatings etc. This causes problems in that shafts, hinges and other moveable parts, in particular of the feeding member, stop up resulting in a worsened mechanical functioning. In addition to production interruptions this leads to problems in feeding a correct amount of powder to the distribution member, which in turn leads to an uneven powder distribution.

JP 2003245981 discloses a powder application system where a supply of powder is stored onto a feeding member in the form of a height-adjustable plate at the side of a working area. Powder is fed to a distributing rake by a) moving the rake sideways away from the working area and over the supply of powder, b) raising the powder supply plate so that a portion of powder becomes positioned above a lower side of the rake, and c) moving the rake towards and across the powder supply so as to transfer the portion of powder towards the working area. A similar system is disclosed in US 2004/0084814. A drawback of such systems is that the function of the mechanically operated powder supply plate has a tendency to worsen in the rough environment, i.e. after some time of operation it will become difficult to accurately control the vertical movement of the plate.

WO 2006/121374 discloses another powder application system wherein the powder supply is arranged in an open manner such as to form an angle of repose on the side of the powder supply facing the working area. A distribution rake is arranged to be moveable towards and a certain distance into the powder supply such as to bring about a transfer of a portion of powder that flows over the rake from the far side of the distribution rake to the side facing the working area. In a second step, the distribution rake is moved towards and across the working area as to distribute the portion of powder onto the working area. An advantage of this system is that no mechanically operated feeding member is required for feeding powder to the distribution rake.

Problems may arise with the device disclosed in WO 2006/121374 when using certain types of powder that do not flow very well. For instance, powder may stay on top of the rake when the rake is moved into the powder supply and the amount of powder in the portion transferred over the rake may vary.

Thus, there is still a need for improvements in this field.

BRIEF SUMMARY

The object of this invention is to provide equipment for layerwize production of three-dimensional objects, which equipment exhibits improved powder application properties compared to conventional equipment. This object is achieved by the apparatus defined by the technical features contained in independent claim 1. The dependent claims contain advantageous embodiments, further developments and variants of the invention.

The invention concerns an apparatus for producing a three-dimensional object layer by layer using a powdery material which can be solidified by irradiating it with an energy beam, such as electromagnetic radiation or an electron beam, said apparatus comprising: a working area onto which layers of powdery material are to be placed; a powder storage unit comprising a base surface for supporting a supply of powder; and a powder distribution member. Further, the base surface extends along a side of the working area, wherein the distribution member extends in a direction along the base surface and said side of the working area and is arranged to be moveable in a plane above, and substantially parallel to, the base surface and the working area. The distribution member is further arranged to be moveable into a supply of powder placed onto the base surface such as to bring about a transfer of a portion of powder from a side of the distribution member facing away from the working area to an opposite side of the distribution member facing the working area, said distribution member further being arranged to be moveable towards and across the working area so as to distribute the portion of powder onto the working area.

The invention is characterized in that at least a part of the powder supporting base surface is arranged to be resilient in a vertical direction.

Due to this design, a part of the base surface, i.e. the resilient part, can be forced to be depressed in a controlled but simple way when the distribution member moves into the powder storage unit. This allows powder to be transferred below the distribution rake; the further the distribution member moves into the powder supply, the more powder will be transferred.

Compared to the device disclosed in WO 2006/121374, where powder is transferred above the distribution member, the inventive design provides for a better control of the size of the powder portion being transferred, in particular when using powder with poor flowability. One reason for this improved control is that the transfer of powder below the distribution member is to a higher extent forced, and thereby principally easier to control, than the transfer above the distribution member where the powder is allowed to flow more freely. Another reason is that the amount of powder being transferred in the inventive apparatus is less strongly dependent on the position of the distribution member. This means that the size of the powder portion transferred can be controlled in a more exact manner (because the amount transferred can be controlled by controlling the position of the distribution member, i.e. by controlling how far it moves into the powder supply, and because any variation in this position has a smaller effect on the amount of powder being transferred when forcing powder below the distribution member than when allowing powder to flow above).

Preferably, the resilient part of the base surface is arranged in such a way that it moves downwards as a result of a downwardly directed force created by the distribution member when moving through a supply of powder placed onto the base surface, and such that the resilient part returns to its original position when the distribution member no longer has any effect on the position of the resilient part.

In a preferred embodiment of the invention the resilient part of the powder supply base surface comprises a resiliently suspended plate. Preferably, the plate is resiliently suspended by means of at least one spring. Preferably, the at least one spring is arranged below the plate.

In another preferred embodiment of the invention the resilient part of the powder supply base surface comprises a flexible and bendable plate.

Such a spring-suspended and/or bendable plate is suitable for being depressed/bent downwards when exposed to the force generated by the distribution member and for returning/bending back when not exposed to said force. The function of such resilient parts is very reliable compared to the mechanically operated, height-adjustable plate shown in JP 2003245981.

Preferably, a covering foil is arranged on top of the base surface. A purpose of such a foil is to prevent that powder particles find their way into any gap between the resilient part and the rest of the base surface. Another purpose is to form a softly curved, continuous surface free from sharp discontinuities when the resilient part is lowered below the level of the surrounding base surface.

BRIEF DESCRIPTION OF THE FIGURES

In the description of the invention given below reference is made to the following figure, in which.

DETAILED DESCRIPTION OF VARIOUS EMBODIMENTS

Figure 1:
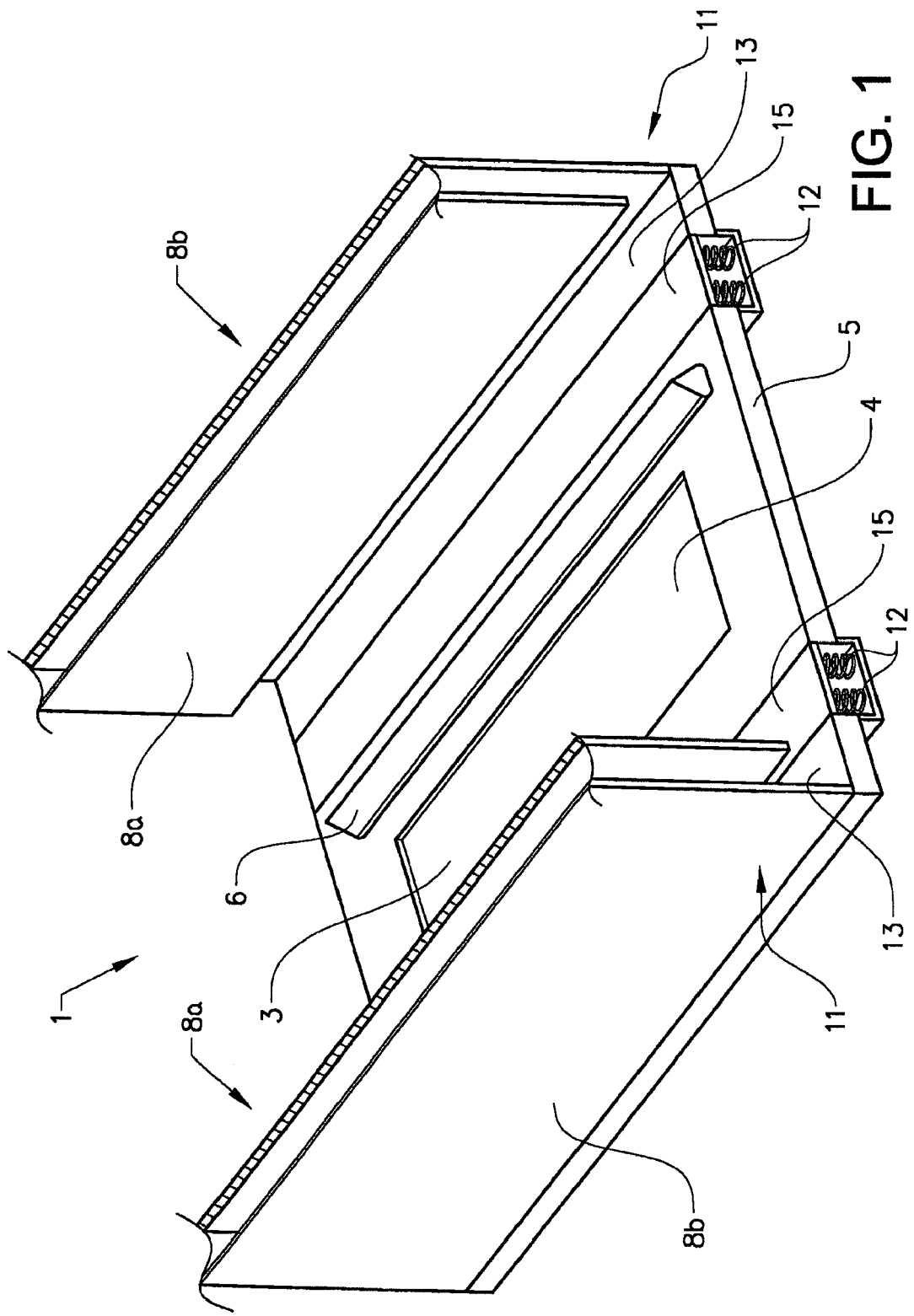
FIG. 1 shows, in a schematic perspective view, a first advantageous embodiment of the invention.

FIGS. 1 and 2 show the components and the function of a first advantageous embodiment of the invention. As shown in these figures the inventive apparatus 1 comprises a powder application system arranged on a substantially flat working table 5, which system comprises two powder storage units 11 symmetrically arranged on opposite sides of a working area 3 located on top of a vertically adjustable platform 4 that fits into a cut-out in the working table 5. Each powder storage unit 11 is adapted to contain a supply of powder 2 (see FIG. 2A). A distribution member 6 in the form of a rake with a triangular-like cross section extends along the working area 3 and is arranged by means of guides (not shown) to be moveable across the working area 3 in a direction perpendicular to its direction of extension and in a plane slightly above the working area 3.

A radiation source (not shown) is arranged in a conventional way at a distance above the working area 3, which working area 3 acts as a target area for the electromagnetic radiation or electron beam used to solidify the powder. If an electron beam is used the space above the working table 5 is thoroughly enclosed, sealed and evacuated to avoid that gas molecules interfere with the electron beam.

Each powder storage unit 11, together with its corresponding powder supply 2, extends along a side of the working area 3 in a direction substantially parallel to the rake 6. First and second walls 8a, 8b, together with end walls (not shown) and a supporting base surface 13, define side and bottom limiting parts of each of the powder storage units 11 and keep the supply of powder 2 in place. The supporting base surface 13 is arranged in the same plane as the upper surface of the work table 5 and may be regarded as forming a part of the work table 5. Each powder storage unit 11 is arranged in an open manner by letting the first wall 8a, that faces the working area 3, end at a distance above the working table 5. This has the effect that a lower part of the supply of powder 2 is free to form an angle of repose, $\alpha$, on the side of the powder supply 2 facing the working area 3. This part of the powder supply 2 is indicated by a dashed line and denoted 2b in FIG. 2A. The powder storage units 11 are filled or refilled from above. Powder storage units 11 filled with powder are shown in FIGS. 2A-2E.

A resiliently suspended plate 15 forms part of the base surface 13 in each of the powder storage units 11. The plate 15 extends along the working area 3 and the powder storage unit 11, parallel to the distribution member 6, and is positioned in relation to the rest of the base surface 13 such that at least a part of the plate 15, i.e. a longitudinal part forming part of its width, is placed below the powder when the powder storage unit 11 is loaded with powder. A longitudinal part of the plate 15 facing the working area 3 may thus be free from powder. For the purpose of this resilient suspension, springs 12 are arranged below the plate 15. These springs 12 are arranged to be compressed and stressed when the plate 15 is pressed downwards and to, when the downwardly directed force is removed, bring the plate 15 back to its original position in level with the rest of the base surface 13.

A thin metal sheet 14 (not shown in FIG. 1) in the form of a flexible, covering foil is secured to a lower part of the second wall 8b and slidably arranged on top of the base surface 13, including the plate 15, such as to form a cover of the base surface 13. The powder 2 is placed on top of the metal sheet 14. The metal sheet 14 is sufficiently flexible to avoid influencing the vertical movement of the plate 15 and to partly follow the plate 15 when moving vertically. A main purpose of the sheet 14 is to prevent that powder particles find their way into the gaps between the plate 15 and the rest of the base surface 13. Another purpose is to form a softly curved, continuous surface when the plate 15 is lowered below the level of the surrounding base surface, i.e. to form a surface that is free from sharp discontinuities also when the plate 15 is lowered.

Figure 2A:
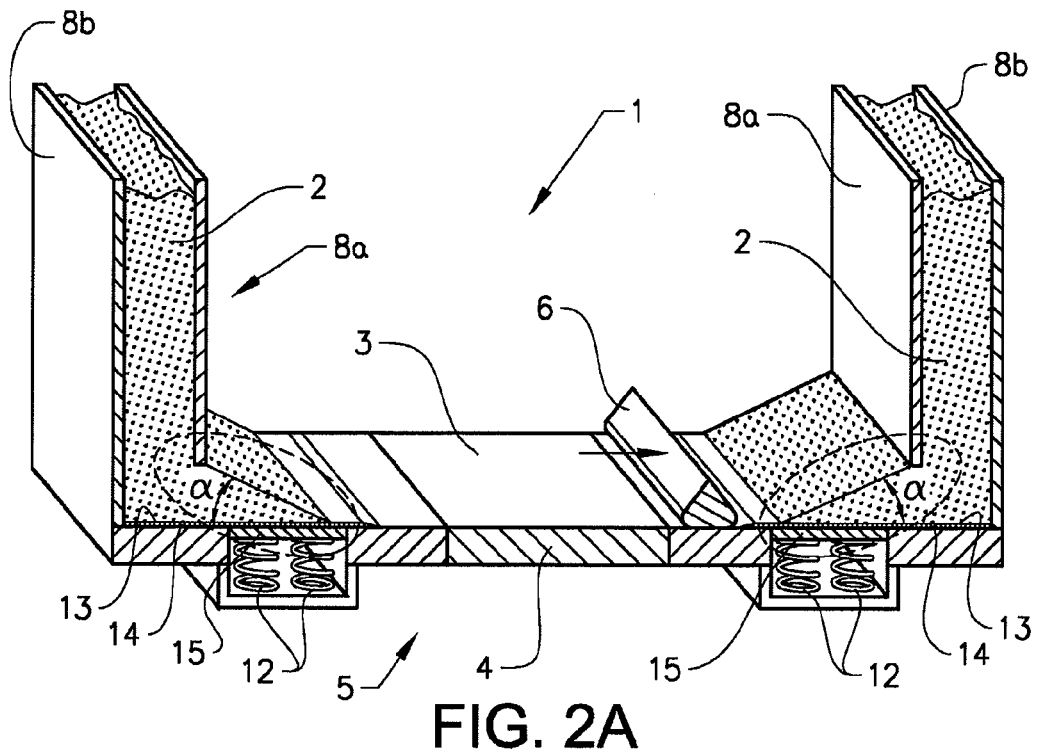
FIGS. 2A-2E show, in a schematic perspective sectional view, the function of the first advantageous embodiment of the invention.

The function of the powder application system of the apparatus 1 will now be described. FIGS. 2A-2E refer to an initial state with regard to the production of a three-dimensional object, i.e. the platform 4 is adjusted to a position slightly below the level of the working table 5 as to facilitate an application of the first layer of powder onto the working area 3. FIG. 2A shows the rake 6 in a first position where it is in motion to the right towards the powder supply 2.

Figure 2B:
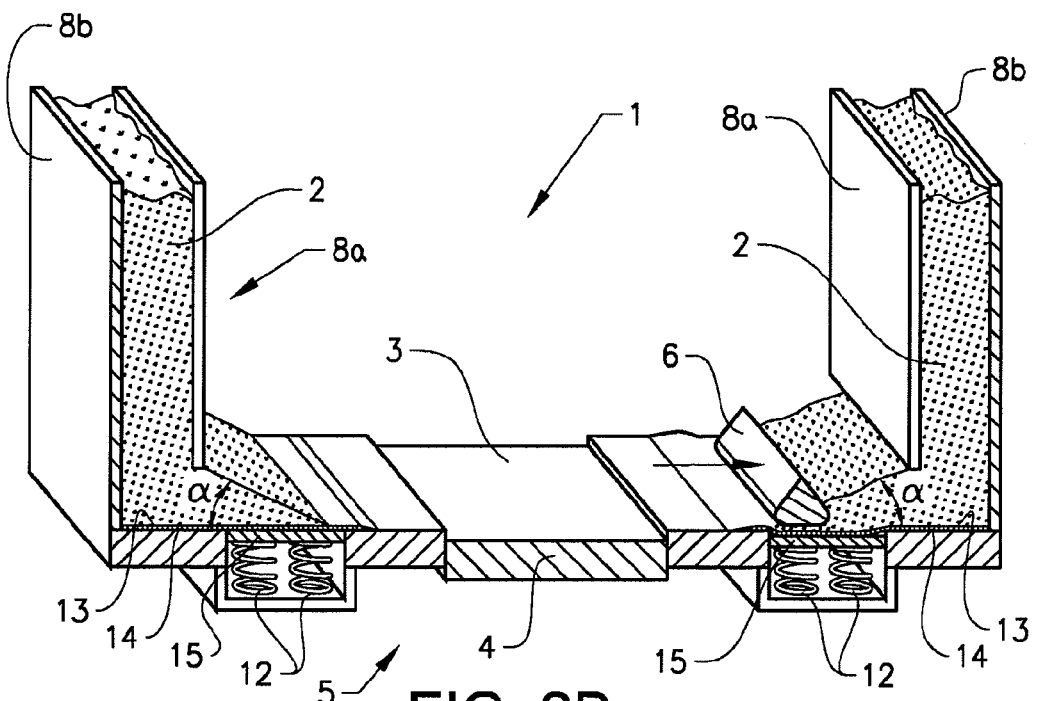

In FIG. 2B the rake 6 has reached a second position somewhat into the powder supply 2 and somewhat in over the resilient part (i.e. the plate 15) of the base surface 13 on its way through the powder supply. The resiliently suspended plate 15 is positioned such that the distribution member 6 passes above at least a part of the plate 15, i.e. a part of its width, on its way towards the powder supply 11. When the distribution rake 6 moves through the powder it generates a pressure onto the powder which pressure, partly due to the weight of the powder supply 2, in turn generates a force that partly is directed downwards and acts onto the resiliently suspended plate 15. When this downwardly directed force is larger than the force of the springs 12, the plate 15, as a result, is moved downwards. In FIG. 2B, the plate 15 has moved somewhat downwards. As the rake 6 moves further into the powder supply 2 (to the right in FIG. 2B), more and more powder are pressed and forced downwards and in under the rake 6 resulting in that the plate 15 is further depressed. As can be seen in FIG. 2B, the plate 15 has at this stage been depressed only a short distance.

Figure 2C:
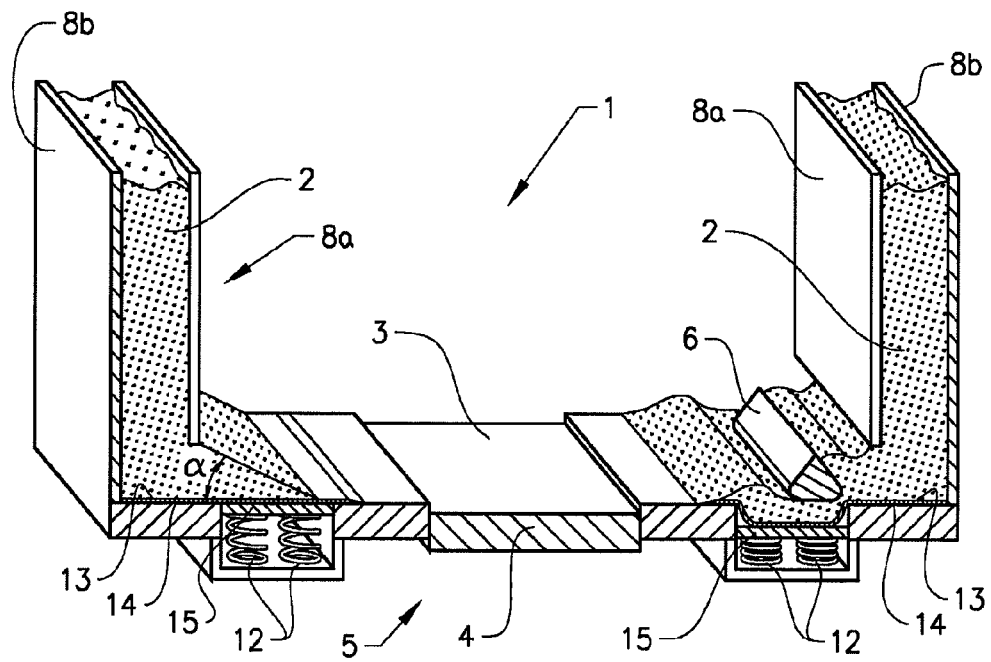

In FIG. 2C the rake 6 has reached a third, end position a certain, final distance into the powder supply 2, i.e. a certain distance in over the resiliently suspended plate 15 and the base surface 13. When the rake 6 has reached this end position a certain portion of powder has been transferred below the rake from the powder supply 2 (i.e. from the right side in FIG. 2C) to the side of the rake 6 facing the working area 3 (i.e. the left side in FIG. 2C). This transferred portion of powder will be pushed towards the working area 3 when the rake 6 moves in the opposite direction, i.e. towards the left in FIG. 2C. The further the distribution member 6 moves into the powder supply 2, i.e. the longer the distance to the end position, the larger the portion of powder transferred.

As indicated in FIG. 2C, the metal foil 14 has partly followed the resiliently suspended plate 15 downwards, i.e. it is in contact with the middle part of the upper side of the plate 15, and provides a smooth, continuous transition between the base surface 13 and the upper side of the depressed resilient plate 15. Thereby it eliminates any sharp edge that would make it difficult to push the portion of powder towards the working area 3.

Figure 2D:
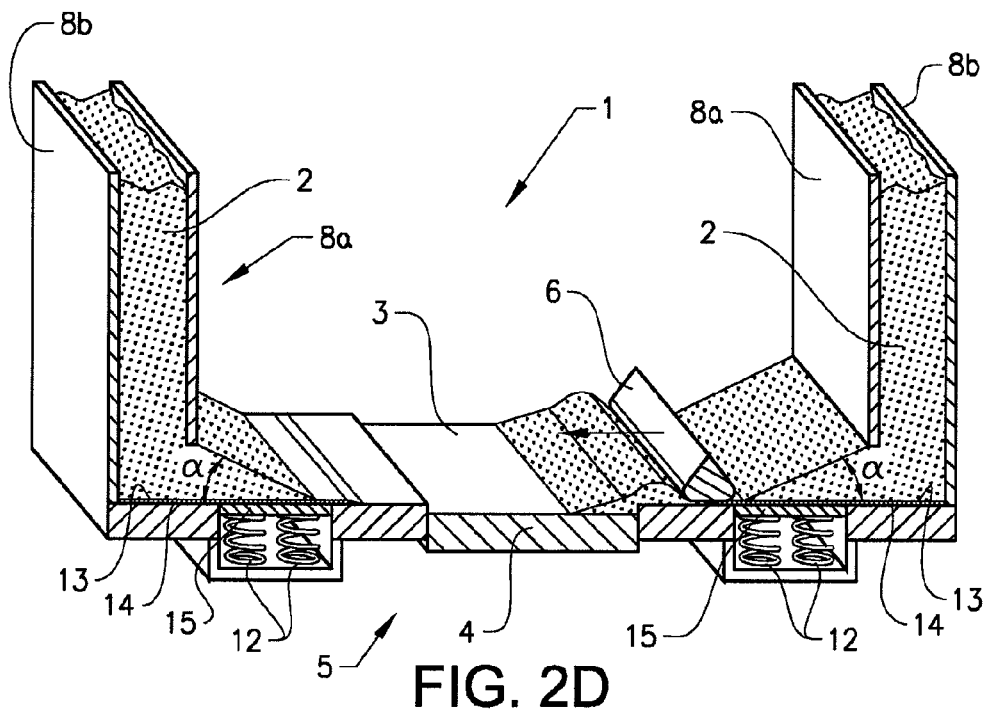

FIG. 2D shows the rake 6 in a similar position as in FIG. 2A but in this case the rake 6 is in motion to the left pushing the portion of powder towards the working area 3. When the resilient plate 15 is depressed, the springs 12 are compressed in a stressed state. When the rake 6 has left the base surface 13 and no longer exerts the resilient plate 15 to any force (as in FIG. 2D), the springs 12 expand and bring the plate 15 back to its original position in level with the base surface 13.

Alternatively, the apparatus can be arranged such that the rake 6 has no effect on the vertical position of the resilient plate 15 when the rake 6 has reached its end position (see FIG. 2C), i.e. the springs 12 have a stiffness suitable for expanding and bringing the plate 15 back to its original position when the rake 6 stops in its end position. In such a case the base surface 13 becomes flat and the function of the covering foil 14 is reduced to cover the gaps along the plate 15.

As shown in FIG. 2D, the supply of powder 2 has now reformed in a consistent manner and exhibits again the same angle of repose, $\alpha$.

Figure 2E:
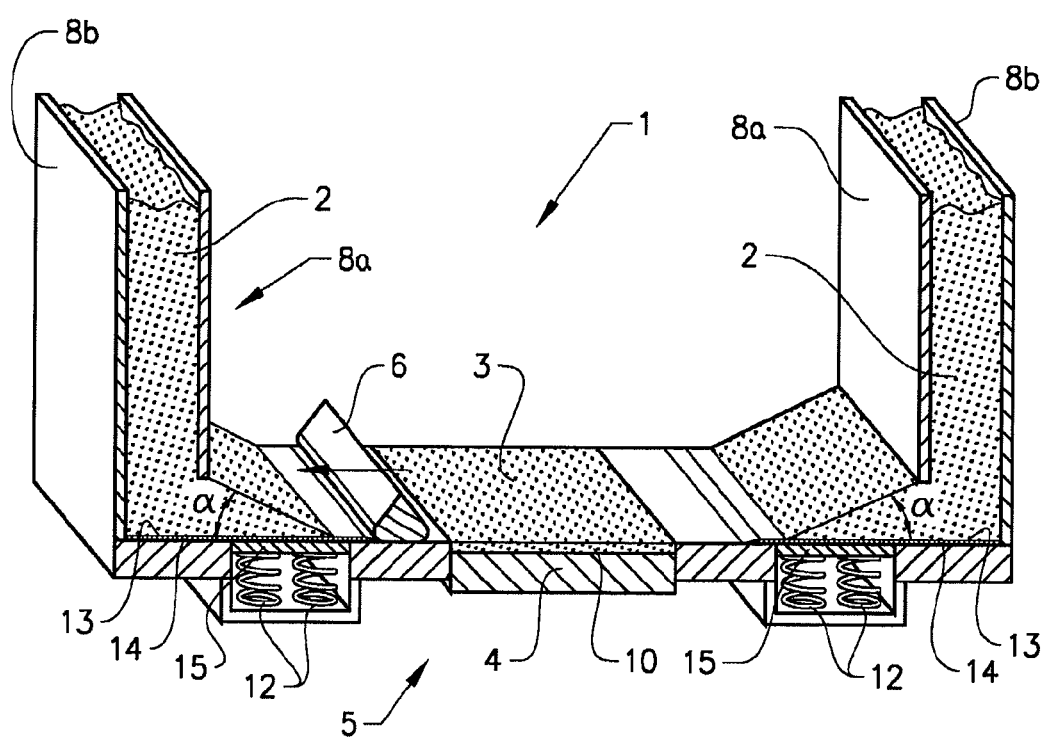

In FIG. 2E the rake 6 is in a fourth position after having passed across the working area 3 onto which a first powder layer 10 now has been applied. At this point the first layer 10 may be solidified by irradiation means.

Preferably, the rake 6 is provided with at least one flexible strip (not shown) that extends along the underside of the rake 6 and that presses slightly upon the working table 5, including e.g. the working area 3 and the base surface 13, when the rake 6 moves across it. Such a flexible strip makes it easier to achieve a uniform layer 10. Moreover, this feature makes the powder application system 1 less sensitive to variations in the distance between the underside of the rake 6 and the working area 3, for instance variations in the distance to the working area caused by irregularities in a sintered surface. Such a strip could, for instance, be formed by a thin, slotted metal plate.

The amount of powder that will be transferred below the distribution member 6 from one side to the other, i.e. the size of the portion of powder to be applied onto the working area 3, is generally dependent on how far the distribution member 6 is moved into the powder supply 2, i.e. the distance from a reference point, e.g. a side of the working area 3, to the end position (see FIG. 2C) in the powder supply 2 where the distribution member 6 stops before it starts to move in an opposite direction. Also the speed, shape and surface properties of the distribution member 6, the design of the powder storage unit 11 as well as the type of powder has an effect on the size of the portion of powder to be applied onto the working area 3. The type of powder has an effect on the flow properties of the powder which affects both the magnitude of the angle of repose, $\alpha$, and the amount of powder passing from side to side below the distribution member 6.

Accordingly, for a given apparatus and a given powder, the size of the portion of powder to be applied onto the working area 3 can be controlled by controlling the movement, and in particular the end position, of the distribution member 6. Preferably, the distribution member 6 is controlled by a central control unit (not shown) that suitably is adapted to also control e.g. the beam used to irradiate the powdery material and the vertical position of the platform 4.

Compared to the device disclosed in WO 2006/121374 the present invention is easier to control since the amount of powder transferred from one side of the distribution member 6 to the other is not so sensitive to the end position of the distribution member 6. For instance, if the end position is moved a certain distance, say 2 mm, further into the supply of powder 2, this results in a certain increase of the portion of powder transferred, and this increase is much smaller in the present invention than in the device disclosed in WO 2006/121374. Accordingly, the size of the powder portions can be controlled in a more exact manner with the present invention.

Another advantage of the present invention compared to the device disclosed in WO 2006/121374 is that the transferred powder portion tends to be more evenly distributed along the distribution member 6.

Depending on the particular design of the apparatus 1, for instance whether it includes any additional means for removing excess or residual powder from the working area 3 or working table 5, there may be powder present at a front side (i.e. the side facing the powder supply) of the distribution rake 6 when it is approaching a powder supply, i.e. when it is in a position corresponding to FIG. 2A. If so, the amount of powder that will be transferred below the distribution member 6 from one side to the other may also depend on the amount of powder already present on the side of the rake 6 facing the powder supply 2. Such already present powder is likely to further depress the resiliently suspended plate 15 which results in that more powder will be transferred below the rake 6 than if no powder is present at the front side of the rake 6 when it approaches the powder supply.

In order to take account of this effect, the apparatus 1 preferably comprises means for determining the amount of powder present at the front side of the rake 6 when it approaches the powder supply. Such means can include sensors for determining to what extent the resilient part 15 is depressed as a function of the position of the rake 6. Alternative means include an arrangement comprising a through-hole in the working table 5 somewhere between the working area 3 and the resilient plate 15 through which through-hole a fraction of the powder present at the front side of the rake 6 is allowed to flow, wherein said arrangement further comprises sensors for determining the amount of powder flowing through the through-hole. Such determining means are preferably connected to the central control unit.

When the amount of powder present at the front side of the rake 6 has been determined it is possible to take this into account by controlling the end position of the distribution member 6, i.e. by adjusting the distance the distribution member 6 is allowed to move into the powder supply 2.

With the expression form an angle of repose is meant that the boundaries of the powder supply 2, at least in a certain region 2*b*, are such that the powder is allowed to form a shape that generally is dependent on the internal friction of the powder in question. By arranging the powder storage unit 11 in an at least partly open manner the powder is allowed to form such an angle of repose. In its simplest form the powder storage unit 11 includes only the base surface 13 onto which the powder supply 2 may be positioned. However, in order to keep the powder supply 2 in place and to facilitate refilling of the powder supply and consistent reforming of the angle of repose the powder storage unit 11 preferably comprises limiting members such as the walls 8*a* and 8*b*.

The angle of repose, α, depends on powder properties, such as type of material, size distribution and particle shape. The shape and position of the part 2*b* of the powder supply 2 forming an angle of repose, α, and possibly also the angle, α, itself, can be affected by e.g. varying the design of the powder storage unit 11.

The amount of powder needed for each layer, i.e. the required size of the powder portion to be applied onto the working area 3, depends e.g. on the size of the object to be produced. It is important that the size of the powder portion is not too small, since this would result in a non-uniform layer thickness. Although the powder application system of the inventive apparatus is relatively insensitive to too large powder portions it may lead to difficulties in applying an even layer if, on the other hand, the powder portion is much too large. Preferably, an amount of powder that is slightly larger than required is selected each time. Because i) the powder application system includes only one mechanically operated moving part: the distribution member 6, ii) this moveable part is relatively easy to control thoroughly, iii) the other moveable part, i.e. the resilient plate 15, has a simple design and a reliable function, and iv) the shape of the powder supply 2 that forms an angle of repose, α, reforms in a consistent manner, the powder application system according to the invention is capable of selecting a portion of powder that is very close to the same size each time.

The powder application system according to the invention is well suited for various metallic, plastic, ceramic or other powdery materials. The term powder should in this context be given a broad interpretation regarding the size or size distribution of the particles present in the powder. The inventive apparatus is applicable to most particle size distributions; a typical particle size may be around 10-100 μm but the particles could be at least one order of magnitude smaller or larger than this range.

The cross section of the distribution member 6 in the preferred embodiment shown in FIGS. 1 and 2 is triangular-like with a sharp edge pointing upwards and with rounded lower edges. However, various cross sections are possible. In order for the distribution member 6 to press the resilient plate 15 downwards when moved into a supply of powder 2 placed onto the base surface 13, it must have a cross-section admitting the creation of a force that, via the powder, at least partly is directed downwardly towards the base surface 13. However, in practice any cross section of the distribution member 6 would achieve this effect. Various modifications of the exemplified cross section of the distribution member 6, and in particular the lower edges, are possible for altering its properties with regard to the depressing of the resilient plate 15 and/or to the pushing and distribution of powder. In a situation where two powder supplies 2 are used, such as in the embodiment described above, the member 6 is preferably symmetric. However, if two different powder types are used, i.e. one type in each powder supply 2, it may be advantageous to give the distribution member 6 an asymmetric cross section. The triangular cross section has an advantage in that only small amounts of powder stays on top of the member 6, which may not be the case with e.g. a rectangular cross section. However, powder placed on top of the rake 6 may be removed by other means.

The embodiment of the invention described above can be summarized as follows: it comprises i) a powder storage unit 11 that is arranged in an open manner such that powder placed onto the base surface 13 in the powder storage unit 11 forms an angle, α, of repose on the side 2*a* of the powder supply 2 facing and extending along the working area 3, ii) a distribution member 6 that is arranged to be, in a first step, moveable towards the powder storage unit 11 such as to reach an end position a predetermined but controllably variable distance into a supply of powder 2 placed in the powder storage unit, iii) a resiliently suspended plate 15 forming part of the base surface 13, which plate 15 is depressed when the distribution member 6 moves through the supply of powder allowing powder to pass below the distribution member 6 such as to bring about a transfer of a portion of powder, when powder is placed in the powder storage unit, from one side of the distribution member 6 to another side of the distribution member 6 facing the working area 3, and iii) a distribution member 6 that is arranged to be, in a second step, moveable towards and across the working area 6 as to distribute the portion of powder onto the working area 3. The size of the portion of powder is controllable and can be predetermined because the powder portion size is dependent on the distance the distribution member 6 moves into the powder supply, which distance can be controlled.

An effect of this design is that it makes the system mechanically simple and reliable because the only moving parts needed for feeding powder from the powder supply unit 11 to the working area 3 are the distributing member 6, which moves into the powder supply 2 and feeds itself with powder, and the resilient plate 15, which makes use of functionally reliable springs 12. A further effect of this design is that it provides a simple and reliable way of feeding correct amounts of powder because the powder supply 2 automatically reforms in a consistent manner and because the movement of the distribution member 6 is easy to control thoroughly.

The design, number and stiffness of the springs 12 should be adapted such as to keep the resiliently suspended plate 15 substantially flush with the rest of the base surface 13 when the distribution member 6 is not positioned in the powder supply 2 and such as to admit the plate 15 to be depressed to a suitable extent when the distribution member 6 moves through the powder supply.

The invention is not limited by the embodiments described above but a number of modifications are possible within the scope of the claims. For instance, as an alternative to the resiliently suspended plate 15 the resilient part of the base surface 13 can comprise a plate that is resilient in itself, i.e. a plate that is flexible and bendable such as to bend downwards when exposed to a force generated by the distribution member 6 and to bend back when not exposed to said force. When using such a bendable plate it may not be necessary to use the covering foil 14.

The springs 12 may be arranged in other ways, for instance above the level of the base surface 13 at the end portions of the plate 15 so that the plate 15 instead is connected to a lower part of the springs which accordingly will be extended, instead of compressed, when the plate 15 is depressed.

The invention claimed is:

1. Apparatus for producing a three-dimensional object layer by layer using a powdery material which can be solidified by irradiating it with an energy beam, such as an electromagnetic radiation or an electron beam, said apparatus comprising:

a working area onto which layers of said powdery material are to be placed;

a powder storage unit comprising a base surface adapted for supporting a supply of said powdery material; and a powder distribution member, wherein:

the base surface extends along a side of the working area;

the distribution member extends in a direction along the base surface and said side of the working area and is arranged to be moveable in a plane above, and substantially parallel to, the base surface and the working area;

the distribution member is arranged to be moveable into a supply of said powdery material placed onto the base surface such as to bring about a transfer of a portion of said powdery material from a side of the distribution member facing away from the working area to an opposite side of the distribution member facing the working area, said distribution member further being arranged to be moveable towards and across the working area so as to distribute the portion of said powdery material onto the working area; and at least a part of the base surface comprises a resiliently suspended plate, which is resiliently suspended by at least one spring in vertical direction.

2. Apparatus according to claim 1, wherein the resilient part of the base surface is arranged in such a way that it moves downwards as a result of a downwardly directed force created by the distribution member when moving through a supply of powder placed onto the base surface, and such that the resilient part returns to its original position when the distribution member no longer has any effect on the position of the resilient part.

3. Apparatus according to claim 1, wherein the at least one spring is arranged below the suspended plate.

4. Apparatus according to claim 1, wherein the resilient part of the powder supply base surface comprises a flexible and bendable plate.

5. Apparatus according to claim 1, wherein the resilient part of the powder supply base surface is positioned such that the distribution member passes above at least a part of the plate on its way towards the powder supply.

6. Apparatus according to claim 4, wherein the flexible and bendable plate is a covering foil and arranged on top of the base surface.

7. Apparatus according to claim 1, wherein:

the apparatus further comprises a supply of the powdery material placed onto the base surface; and the powder supply is arranged in an open manner such that the powder supply forms an angle of repose on a side of the powder supply that faces the working area.

8. Apparatus according to claim 1, wherein the working area is located on a vertically adjustable platform.

9. Apparatus according to claim 1, wherein the apparatus further comprises a radiation source for producing said energy beam.

* * * * *